(12) United States Patent
Martin

(10) Patent No.: US 10,225,758 B2
(45) Date of Patent: Mar. 5, 2019

(54) TELECOMMUNICATIONS APPARATUS AND METHOD FOR REPORTING CHANNEL MEASUREMENTS FROM A TERMINAL

(71) Applicant: SONY CORPORATION, Tokyo (JP)

(72) Inventor: Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 15/513,437

(22) PCT Filed: Nov. 20, 2015

(86) PCT No.: PCT/EP2015/077273
§ 371 (c)(1),
(2) Date: Mar. 22, 2017

(87) PCT Pub. No.: WO2016/079323
PCT Pub. Date: May 26, 2016

(65) Prior Publication Data
US 2017/0311194 A1    Oct. 26, 2017

(30) Foreign Application Priority Data
Nov. 21, 2014   (EP) .................................... 14194388

(51) Int. Cl.
*H04W 24/10*   (2009.01)
*H04L 5/00*    (2006.01)
(Continued)

(52) U.S. Cl.
CPC .......... *H04W 24/10* (2013.01); *H04L 5/0048* (2013.01); *H04W 88/02* (2013.01); *H04W 88/08* (2013.01)

(58) Field of Classification Search
None
See application file for complete search history.

(56) References Cited

U.S. PATENT DOCUMENTS

2013/0208587 A1   8/2013   Bala et al.
2013/0286919 A1*  10/2013  Kawashima ...... H04W 52/0206
                                                  370/311
(Continued)

FOREIGN PATENT DOCUMENTS

GB      2509910 A      7/2014
WO    WO 2012/116489 A1   9/2012
(Continued)

OTHER PUBLICATIONS

3GPP TSG RAN WG1 Meeting #79, ZTE, "Considerations on Measurements for LAA", Agenda Item 6.3.2.2, R1-144827, (Nov. 17-21, 2014), pp. 1-4, XP050885499.
(Continued)

*Primary Examiner* — Anh Ngoc M Nguyen
(74) *Attorney, Agent, or Firm* — Xsensus LLP

(57) ABSTRACT

A method of obtaining a virtual measurement result for an inactive channel in a wireless telecommunications system, the system including one or more terminals and a base station providing one or more active channels for communicating wireless signals with the one or more terminals, wherein a channel is inactive if it is not currently provided by the base station for use by the one or more terminals. The method includes: selecting an active channel of the one or more active channels; obtaining a first measurement result based on signals transmitted by the base station on the active channel; and deriving a virtual measurement result for the inactive channel from the first measurement result, thereby obtaining a virtual measurement result for the inactive channel.

21 Claims, 9 Drawing Sheets

(51) Int. Cl.
*H04W 88/02* (2009.01)
*H04W 88/08* (2009.01)

(56) References Cited

U.S. PATENT DOCUMENTS

| | | | |
|---|---|---|---|
| 2013/0336156 A1 | 12/2013 | Wei et al. | |
| 2014/0302865 A1 | 10/2014 | Bai et al. | |
| 2014/0335883 A1* | 11/2014 | Ericson | H04W 52/26 455/452.2 |
| 2015/0341911 A1 | 11/2015 | Wakabayashi et al. | |
| 2015/0358990 A1* | 12/2015 | Kovacs | H04W 24/02 370/329 |
| 2017/0111130 A1* | 4/2017 | Zhao | H04B 17/318 |

FOREIGN PATENT DOCUMENTS

| | | |
|---|---|---|
| WO | WO 2013/059999 A1 | 5/2013 |
| WO | WO 2013/112983 A2 | 8/2013 |

OTHER PUBLICATIONS

3GPP TSG RAN Meeting #65, Ericsson, Qualcomm, Huawei, Alcatel-Lucent, "Study on Licensed-Assisted Access using LTE", Agenda Item 14.1.1, RP-141664, revision of RP-141646, (Sep. 9-12, 2014), 7 pages.
Holma et al., LTE for UMTS OFDMA and SC-FDMA Based Radio Access, John Wiley and Sons, (2009), 4 pages.
ETSI TS 136 211, V11.5.0, LTE; Evolved Universal Terrestrial Radio Access (E-UTRA); Physical channels and modulation (3GPP TS 36.211 version 11.5.0 Release 11), (Jan. 2014), 122 pages.
ETSI TS 136 212, V11.4.0. LTE; Evolved Universal Terrestrial Radio Access (E-UTRA); Multiplexing and channel coding (3GPP TS 36.212 version 11.4.0 Release 11), (Jan. 2014), 86 pages.
ETSI TS 136 213, V11.6.0. LTE; Evolved Universal Terrestrial Radio Access (E-UTRA); Physical layer procedures (3GPP TS 36.213 version 11.6.0 Release 11), (Mar. 2014), 184 pages.
ETSI TS 136 321, V11.5.0. LTE; Evolved Universal Terrestrial Radio Access (E-UTRA); Medium Access Control (MAC) protocol specification (3GPP TS 36.321 version 11.5.0 Release 11), (Mar. 2014), 59 pages.
ETSI TS 136 331, V12.3.0, LTE; Evolved Universal Terrestrial Radio Access (E-UTRA); Radio Resource Control (RRC); Protocol Specification (3GPP TS 36.331 version 12.3.0 Release 12), (Sep. 2014), 383 pages.
International Search Report dated Apr. 18, 2016 in PCT/EP2015/077273, filed Nov. 20, 2015.

* cited by examiner

TELECOMMUNICATIONS APPARATUS AND METHOD FOR REPORTING CHANNEL MEASUREMENTS FROM A TERMINAL

CROSS-REFERENCE TO RELATED APPLICATIONS

The present application is based on PCT filing PCT/EP2015/077273 filed Nov. 20, 2015, and claims priority to European Patent Application 14 194 388.6, filed in the European Patent Office on Nov. 21, 2014, the entire contents of each of which being incorporated herein by reference.

BACKGROUND

Field

The present disclosure relates to mobile communications networks and methods for obtaining a measurement result in mobile communications networks, infrastructure equipment for mobile communications networks, communications devices for use with mobile communications networks and methods of obtaining a measurement result for an inactive channel in a wireless telecommunications system and of transmitting a measurement report in a wireless telecommunications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). As a result of this approach, an operator has guarantees of no other radio services interfering with the radio resources that have been assigned to the operator, and within the limitations of the license conditions it has exclusive control over what radio technology it deploys in the network. Consequently, a wireless telecommunications system that is primarily designed to operate using radio resources that have been licensed for exclusive use by the wireless telecommunications system can operate with a degree of centralised control and coordination to help make most efficient use of the available radio resources. Such a wireless telecommunication system also manages all the interference internally, based on standard specifications, since the licence grants it good immunity from external interference sources. Coexistence of different devices deployed on an MNO's licensed band is managed through conformance to relevant radio standards. Licensed spectrum is today usually assigned to operators via government-organised auctions, but so-called "beauty contests" continue also to be in use.

It is also well known in the field of wireless telecommunications for regions of the available radio spectrum to remain unlicensed. Unlicensed (licence exempt) radio spectrum may, at least to some extent, be freely used by a number of different technologies, such as Wi-Fi and Bluetooth and other non-3GPP radio access technologies. Operating parameters for devices using unlicensed spectrum bands are typically stipulated by technical regulatory requirements such as e.g. the FCC Part 15 rule for 2.4 GHz ISM band. Coexistence of different devices deployed on unlicensed band, due to the lack of centralised coordination and control, is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum. The use of unlicensed radio spectrum in LTE is sometimes referred to as LTE-A or LAA-LTE (LAA standing for "Licensed-Assisted Access").

However, in contrast to licensed spectrum, unlicensed spectrum can be shared and used among different technologies, or different networks using the same technology, without any co-ordinated/centralised control, for example to provide protection against interference. As a consequence of this, the use of wireless technologies in unlicensed spectrum can be subject to unpredictable interference and has no guarantees of spectrum resources, i.e. the radio connection takes place on a best effort basis. This means that wireless network technologies, such as LTE, which are generally designed to operate using licensed radio resources, require modified approaches to allow them to efficiently use unlicensed radio resources, and in particular to co-exist reliably and fairly with other radio access technologies that may be simultaneously operating in the unlicensed spectrum band.

Therefore, deploying a mobile radio access technology system primarily designed to operate in licensed spectrum bands (i.e. having exclusive access to, and hence a level of control over, the relevant radio resources) in a manner which is required by operation in unlicensed spectrum bands (i.e. without having exclusive access to at least some of the relevant radio resources), gives rise to new technical challenges.

SUMMARY

According to an aspect of the present disclosure, there is provided a method of obtaining a virtual measurement result for a first channel in a wireless telecommunications system, the system comprising one or more terminals and a base station providing one or more active channels for communicating wireless signals with the one or more terminals. The method comprises selecting an active channel of the one or more active channels, the active channel being different from the first channel; obtaining a first measurement result based on signals transmitted by the base station on the active channel; and deriving a virtual measurement result for the first channel from the first measurement result, thereby obtaining a virtual measurement result for the first channel. For example, the first channel may be an inactive channel, wherein a channel is inactive if it is not currently provided by the base station for use by the one or more terminals.

According to another aspect of the present disclosure there is provided a method of transmitting a measurement report in a wireless telecommunications system, the system comprising one or more terminals and a base station providing one or more active channels for communicating wireless signals with the one or more terminals. The method comprises obtaining a virtual measurement result for an first channel, for example using the method above; determining whether the virtual measurement result meets a set of conditions, the set of conditions comprising one or more conditions; and if it is determined that the virtual measurement result meets the set of conditions, transmitting a measurement based on the virtual measurement result. For example, the first channel may be an inactive channel, wherein a channel is inactive if it is not currently provided by the base station for use by the one or more terminals.

According to a further aspect of the present disclosure there is provided a terminal device for use in a wireless telecommunications system, the system comprising a base station providing one or more active channels for communicating wireless signals with the terminal. The terminal device is configured to select an active channel of the one or more active channels, the active channel being different from the first channel; obtain a first measurement result based on signals transmitted by the base station on the active channel; derive a virtual measurement result for the first channel from the first measurement result, thereby obtaining a virtual measurement result for the first channel. For example, the first channel may be an inactive channel, wherein a channel is inactive if it is not currently provided by the base station for use by one or more terminals.

According to yet another aspect of the present disclosure, there is provided circuitry for a terminal device for use in a wireless telecommunications system, the system comprising a base station providing one or more active channels for communicating wireless signals with the terminal. The circuitry comprises a controller element and a transceiver element configured to operate together to: select an active channel of the one or more active channels, the active channel being different from the first channel; obtain a first measurement result, wherein the first measurement result is based on signals transmitted by the base station on the active channel; and derive a virtual measurement result for the first channel from the first measurement result, thereby obtaining a virtual measurement result for the first channel. For example, the first channel may be an inactive channel, wherein a channel is inactive if it is not currently provided by the base station for use by one or more terminals.

According to a further aspect of the present disclosure, there is provided a method of managing measurements for an first channel in a wireless telecommunications system, the system comprising one or more terminals and a base station providing one or more active channels for communicating wireless signals with the one or more terminals. The method comprises selecting a first channel for measurement; and transmitting, to a first terminal of the one or more terminals, measurement configuration information identifying the first channel for the terminal to obtain a virtual measurement result on; wherein the virtual measurement result is derived from measurements carried out on an active channel different from the first channel. For example, the first channel may be an inactive channel, wherein a channel is inactive if it is not currently provided by the base station for use by the one or more terminals.

According to an additional aspect of the present disclosure, there is provided a base station for use in a wireless telecommunications system, the base station being configured to provide one or more active channels for communicating wireless signals with one or more terminals of the wireless telecommunications system. The base station device being configured to select a first channel for measurement; and transmit, to a first terminal of the one or more terminals, measurement configuration information identifying the first channel for the terminal to obtain a virtual measurement result on; wherein the virtual measurement result is derived from measurements carried out on an active channel different from the first channel. For example, the first channel may be an inactive channel, wherein a channel is inactive if it is not currently provided by the base station for use by the one or more terminals.

According to another aspect of the present disclosure, there is provided circuitry for a base station for use in a wireless telecommunications system, the base station being configured to provide one or more active channels for communicating wireless signals with one or more terminals of the wireless telecommunications system. The circuitry comprises a controller element and a transceiver element configured to operate together to select a first channel for measurement; and transmit, to a first terminal of the one or more terminals, measurement configuration information identifying the first channel for the terminal to obtain a virtual measurement result on; wherein the virtual measurement result is derived from measurements carried out on an active channel different from the first channel. For example, the first channel may be an inactive channel, wherein a channel is inactive if it is not currently provided by the base station for use by the one or more terminals.

According to yet another aspect of the present disclosure, there is provided a wireless telecommunication system comprising a terminal device as discussed above; and a base station as discussed above.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
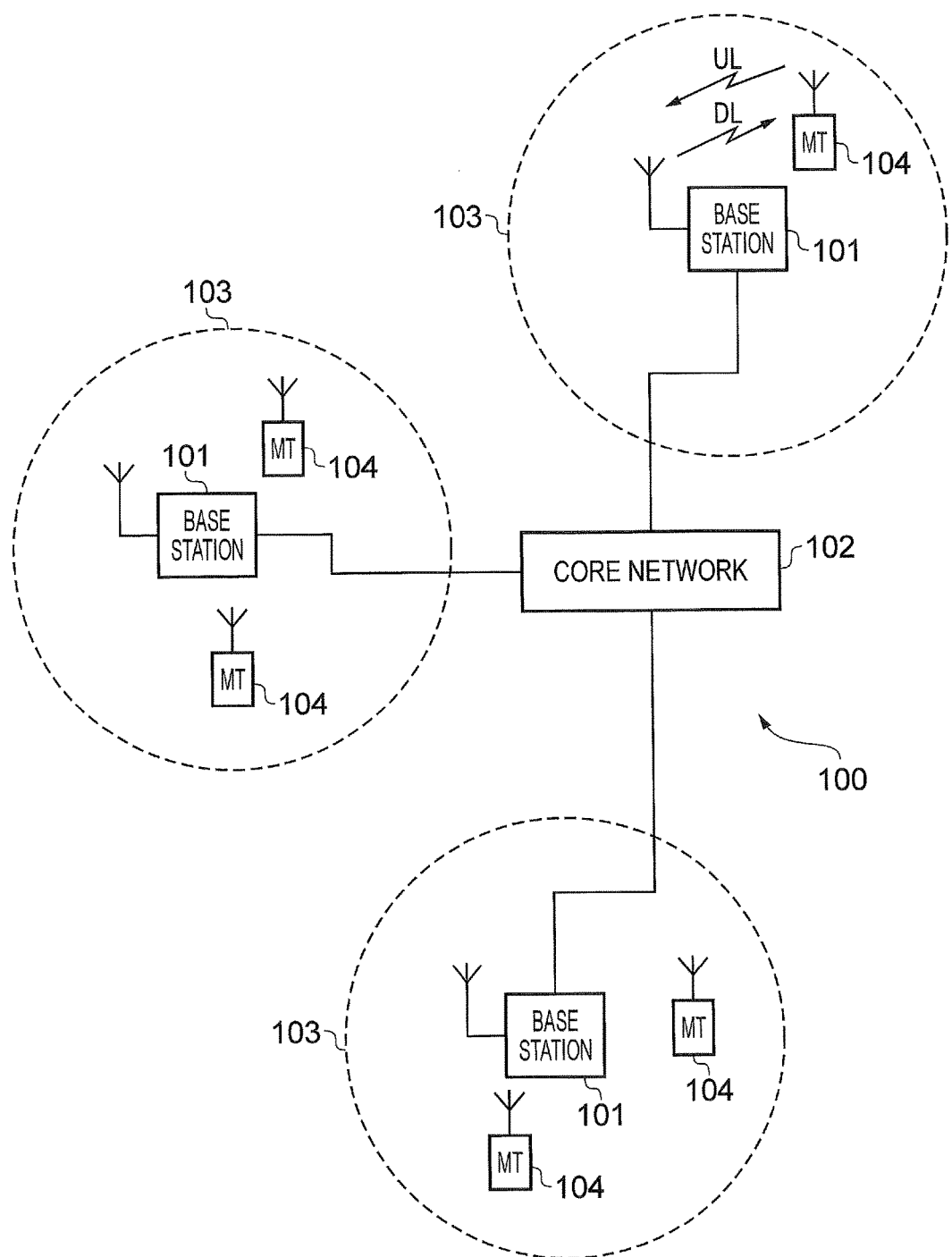
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licenced for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, terminal, mobile radio, and so forth. Base stations may also be referred to as transceiver stations/nodeBs/e-nodeBs, and so forth.

Figure 2:
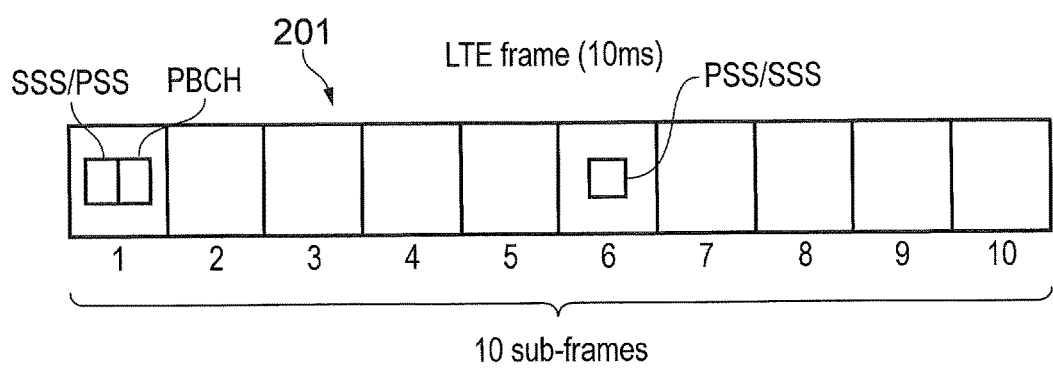
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
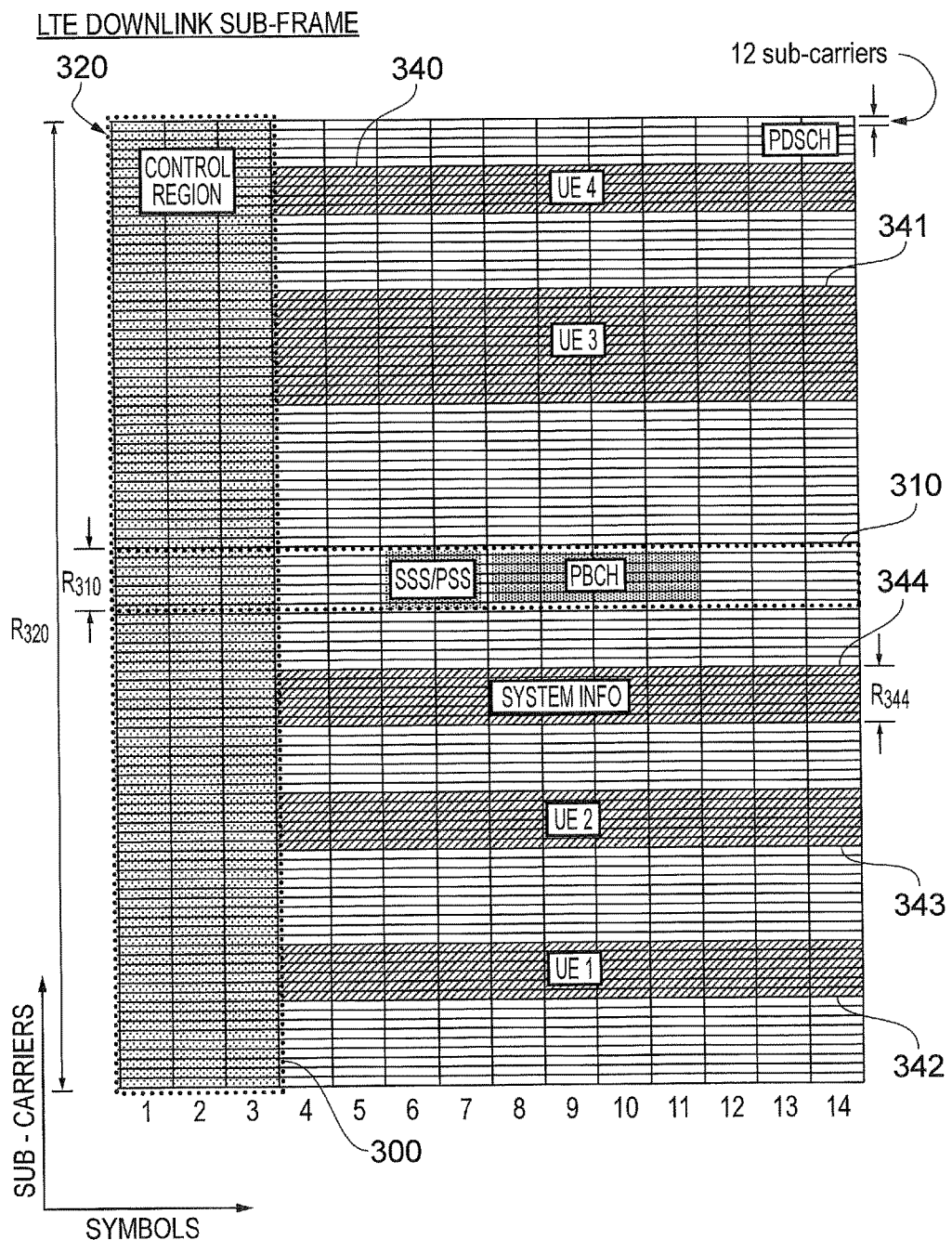
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licenced for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer). FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the terminal devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator. Other devices may be operating using other radio resources in an unlicensed radio spectrum band, for example using Wi-Fi or Bluetooth technologies.

As noted above, it has been proposed that a wireless telecommunications network using radio resources in a licensed portion of the radio spectrum might be supported by using radio resources in an unlicensed portion of the radio spectrum (i.e. a portion of the radio spectrum over which the wireless telecommunications network does not have exclusive access, but rather which is shared by other access technologies and/or other wireless telecommunications networks). In particular, it has been proposed that carrier aggregation based techniques may be used to allow unlicensed radio resources to be used in conjunction with licensed radio resources.

In essence, carrier aggregation allows for communications between a base station and a terminal device to be made using more than one carrier. This can increase the maximum data rate that may be achieved between a base station and a terminal device as compared to when using only one carrier and can help enable more efficient and productive use of fragmented spectrum. Individual carriers that are aggregated are commonly referred to as component carriers (or sometimes simply components). In the context of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as ETSI TS 136 211 V11.5.0 (2014-01)/3GPP TS 36.211 version 11.5.0 Release 11 [2], ETSI TS 136 212 V11.4.0 (2014-01)/3GPP TS 36.212 version 11.4.0 Release 11 [3]; ETSI TS 136 213 V11.6.0 (2014-03)/3GPP TS 36.213 version 11.6.0 Release 11 [4]; ETSI TS 136 321 V11.5.0 (2014-03)/3GPP TS 36.321 version 11.5.0 Release 11 [5]; and ETSI TS 136 331 V12.3.0 (2014-09)/3GPP TS 36.331 version 12.3.0 Release 12 [6].

In accordance with the terminology and implementation used for carrier aggregation in the context of an LTE-based system, a cell is denoted the 'primary cell', or Pcell, for a terminal device if it is the cell that is initially configured during connection setup for the terminal device. Thus the primary cell handles RRC (radio resource control) connection establishment/re-establishment for the terminal device. The primary cell is associated with a downlink component carrier and an uplink component carrier (CoC). These may sometimes be referred to herein as primary component carriers. A cell that is configured for use by the terminal device after initial connection establishment on the Pcell is termed a 'secondary cell', or Scell. Thus the secondary cells are configured after connections establishment to provide additional radio resources. The carriers associated with Scells may sometimes be referred to herein as secondary component carriers. Since in LTE up to five component carriers can be aggregated, up to four Scells (correspondingly associated with up to four secondary component carriers) can be configured for aggregation with the primary cell (associated with the primary component carrier). An Scell might not have both a downlink and uplink component carrier and the association between uplink component carriers and downlink component carriers is signalled in SIB2 on each downlink component carrier. The primary cell supports PDCCH and PDSCH on downlink and PUSCH and PUCCH on uplink whereas the secondary cell(s) support PDCCH and PDSCH on downlink and PUSCH on uplink, but not PUCCH. Measurement and mobility procedures are handled on the Pcell and the Pcell cannot be de-activated. The Scell(s) may be dynamically activated and deactivated, for example according to traffic needs, though MAC layer signalling to the terminal device. An Scells for a terminal device may also be deactivated automatically (time out) if the terminal device does not receive any transmission resource allocations on the Scell for a threshold amount of time.

Some aspects of physical layer control signalling for an LTE-based implementation of carrier aggregation based on the current standards are now described.

Each downlink component carrier has the normal LTE control channels: (E)PDCCH, PCFICH and PHICH. However, carrier aggregation introduces the possibility of so-called cross-carrier scheduling (XCS) on PDCCH. To support cross-carrier scheduling, a downlink control information (DCI) message on PDCCH includes a carrier indicator field (CIF) comprising three bits to indicate which of the component carriers the PDCCH message applies to. If there is no CIF, the PDCCH is treated as applying to the carrier on which it is received. A motivation for providing cross-carrier scheduling primarily applies for heterogeneous network (het-net) scenarios where overlaid macro- and small-cells may operate carrier aggregation in the same band. The effects of interference between the respective macro- and small-cells' PDCCH signalling can be mitigated by having the macro-cell transmit its PDCCH signalling on one component carrier at relatively high transmit power (to provide coverage across the macro-cell), while the small-cells use an alternative component carrier for their PDCCH scheduling.

The control region supporting PDCCH may differ in size (i.e. number of OFDM symbols) between component carriers, so they can carry different PCFICH values. However, the potential for interference in the control region in a het-net implementation may mean that PCFICH cannot be decoded on a particular component carrier. Therefore, current LTE standards allow for each component to carrier a semi-static indication of which OFDM symbol PDSCH can be assumed to begin in each subframe. If fewer OFDM symbols are actually used for the control region, the free/spare OFDM symbol(s) may be used for PDSCH transmissions to terminal devices which are not being cross-carrier scheduled as they will decode the actual PCFICH. If more OFDM symbols actually used for the control region, there will be some degree of performance degradation for the cross-carrier scheduled terminal devices.

PHICH signalling is sent on the downlink component carrier that sent the PDCCH signalling containing the PUSCH allocation to which the PHICH signalling relates. Accordingly, one downlink component carrier may carry PHICH for more than one component carrier.

In the uplink, the basic operation of PUCCH is not altered by the introduction of carrier aggregation. However, a new PUCCH format (format 3) is introduced to support the sending of acknowledgement signalling (ACK/NACK signalling) for multiple downlink component carriers, and with some alterations to format 1 b to increase the number of ACK/NACK bits it can carry.

In current LTE-based carrier aggregation scenarios, primary and secondary synchronisation signalling (PSS and SSS) are transmitted on all component carriers using the same physical-layer cell identity (PCI) and component carriers are all synchronised with one another. This can help with cell search and discovery procedures. Issues relating to security and system information (SI) are handled by the Pcell. In particular, when activating an Scell, the Pcell delivers the relevant SI for the Scell to the terminal device using dedicated RRC signalling. If the system information relating to a Scell changes, the Scell is released and re-added by Pcell RRC signalling (in one RRC message). Pcell changes, e.g. due to long-term fluctuations in channel quality across the Pcell bandwidth, are handled using a modified handover procedure. The source Pcell passes all the relevant carrier aggregation (CA) information to the target Pcell so the terminal device can begin to use all the assigned component carriers when handover is complete.

Random access procedures are primarily handled on the uplink component carrier of Pcell for a terminal device, although some aspects of contention resolution signalling may be cross-carrier scheduled to another serving cell (i.e. an Scell).

As noted above, carrier aggregation is one approach for making use of unlicensed radio spectrum resources in wireless communication networks which are primarily designed to use licensed radio spectrum. In broad summary, a carrier aggregation based approach may be used to configure and operate a first component carrier (e.g. a primary component carrier associated with a Pcell in LTE terminology) within a region of the radio spectrum that has been licensed for use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Although known carrier aggregation schemes can form a basis for using unlicensed radio spectrum resources (or other forms of shared radio resources) in conjunction with licensed radio spectrum resources, some modifications to known carrier aggregation techniques may be appropriate to help optimise performance. This is because radio interference in the unlicensed radio spectrum can be expected to be subject to a wider range of unknown and unpredictable variations in time and frequency than might be seen within a region of the radio spectrum which has been licensed for use by a particular wireless applications system. For a given wireless telecommunications system operating in accordance with a given technology, such as LTE-A, interference in the unlicensed radio spectrum may arise from other systems operating quantity same technology, or systems operating according to different technologies, such as Wi-Fi or Bluetooth.

Figure 4:
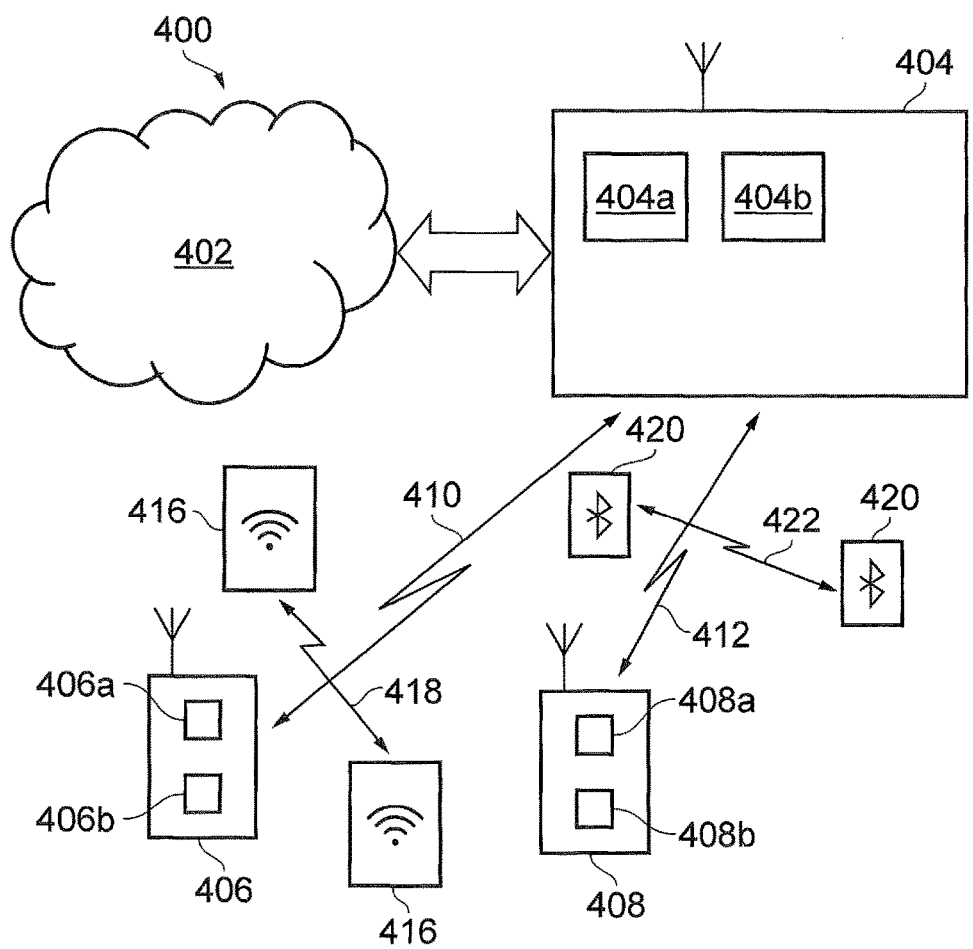
FIG. 4 schematically represents a wireless telecommunications system according to an embodiment of the disclosure.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first terminal device 406 and a second terminal device 408. It will of course be appreciated that in practice the radio network part may comprise a plurality of base stations serving a larger number of terminal devices across various communication cells. However, only a single base station and two terminal devices are shown in FIG. 4 in the interests of simplicity.

Although not part of the telecommunications system 400 itself, also shown in FIG. 4 are some other devices which are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with one another via radio link 422 operating in accordance with a Bluetooth standard. These other devices represent a potential source of radio interference for the telecommunications system 400. It will be appreciated that in practice there will typically be many more such devices operating in the radio environment of the wireless telecommunications system 400, and only two pairs of devices 416, 418 are shown in FIG. 4 for simplicity.

As with a conventional mobile radio network, the terminal devices 406, 408 are arranged to wirelessly communicate data to and from the base station (transceiver station) 404. The base station is in turn communicatively connected to a serving gateway, S-GW, (not shown) in the core network part which is arranged to perform routing and management of mobile communications services to the terminal devices in the telecommunications system 400 via the base station 404. In order to maintain mobility management and connectivity, the core network part 402 also includes a mobility management entity (not shown) which manages the enhanced packet service, EPS, connections with the terminal devices 406, 408 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The terminal devices 406, 408 each comprise a transceiver unit 406a, 408a for transmission and reception of wireless signals and a controller unit 406b, 408b configured to control the operation of the respective devices 406, 408 in accordance with embodiments of the disclosure. The respective controller units 406b, 408b may each comprise a processor unit which is suitably configured/programmed to provide the desired functionality described herein using conventional programming/configuration techniques for equipment in wireless telecommunications systems. For each of the terminal devices 406, 408, their respective transceiver units 406a, 408a and controller units 406b, 408b are schematically shown in FIG. 4 as separate elements for ease of representation. However, it will be appreciated that for each terminal device the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal devices 406, 408 will in general comprise various other elements associated with their operating functionality in accordance with established wireless telecommunications techniques (e.g. a power source, possibly a user interface, and so forth).

As has become commonplace in the field of wireless telecommunications, terminal devices may support Wi-Fi and Bluetooth functionality in addition to cellular/mobile telecommunications functionality. Thus the transceiver units 406a, 408a of the respective terminal devices may comprise functional modules operable according to different wireless communications operating standards. For example, the terminal devices' transceiver units may each comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 406a, 408a of the terminal devices 406, 408 represented in FIG. 4 are assumed here to provide the functionality of an LTE transceiver module, a Wi-Fi transceiver module and a Bluetooth transceiver module in accordance with conventional wireless communications techniques.

The base station 404 comprises a transceiver unit 404a for transmission and reception of wireless signals and a controller unit 404b configured to control the base station 404. The controller unit 404b may comprise a processor unit which is suitably configured/programmed to provide the desired functionality described herein using conventional programming/configuration techniques for equipment in wireless telecommunications systems. The transceiver unit 404a and the controller unit 404b are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 404b.

Thus, the base station 404 is configured to communicate data with the first and second terminal devices 406, 408 over respective first and second radio communication links 410, 412. The wireless telecommunications system 400 supports a carrier aggregation mode of operation in which the first and second radio communication links 410, 412 each comprise a wireless access interface provided by multiple component carriers. For example, each radio communication link may comprise a primary component carrier and one or more secondary component carriers. Furthermore, the elements comprising the wireless telecommunications system 400 in accordance with this embodiment of the disclosure are assumed to support carrier aggregation in an unlicensed spectrum mode. In this unlicensed spectrum mode the base station communicates with terminal devices using a primary component carrier operating on radio resources within a first frequency band that has been licensed for use by the wireless telecommunications system and one or more secondary component carriers operating on radio resources within a second frequency band that has not been licensed for exclusive use by the wireless telecommunications system. The first frequency band may sometimes be referred to herein as a licensed frequency band and the second frequency band may sometimes be referred to herein as an unlicensed (U)

frequency band. In the context of an LTE-based wireless telecommunications system, such as that represented in FIG. 4, operation in the unlicensed frequency band may be referred to as an LTE-U mode of operation. The first (licenced) frequency band may be referred to as an LTE band (or more particularly an LTE-A band) and the second (unlicensed) frequency band may be referred to as an LTE-U band. Resources on the LTE-U band may be referred to as U-resources. A terminal device able to make use of U-resources may be referred to as a U-terminal device (or U-UE). More generally, the qualifier "U" may be used herein to conveniently identify operations in respect of the unlicensed frequency band.

It will be appreciated that the use of carrier aggregation techniques and the use of unlicensed spectrum resources (i.e. resources that may be used by other devices without centralised coordination) in accordance with embodiments of the disclosure may be based generally on previously proposed principles for such modes of operation, for example as discussed above, but with modifications as described herein to provide additional functionality in accordance with embodiments of the present disclosure. Accordingly, aspects of the carrier aggregation and unlicensed spectrum operation which are not described in detail herein may be implemented in accordance with known techniques.

Modes of operation for the wireless telecommunications network 400 represented in FIG. 4 in accordance with certain embodiments of the disclosure will now be described. The general scenario for these embodiments is assumed to be one in which a carrier aggregation capable terminal device is operating in an LTE-A cell as normal, and the base station determines that it should configure the LTE-U capable terminal device with an additional aggregated carrier using LTE-U resources. Thus the LTE-A carrier provides a Pcell for the terminal device and the LTE-U resources provide one or more Scell(s) for the terminal device. It will be appreciated the LTE-A resources may also be used to provide component carriers associated with one or more further Scells(s) in accordance with conventional carrier aggregation techniques. For the examples described with reference to FIG. 4, the LTE-A transmissions in the licenced frequency band and the LTE-U transmissions in the unlicensed frequency band, and thus the Pcell and Scell(s), are both made from the same base station 404, but this may not be the case in other example embodiments. The LTE-U carrier could in general be utilised with a TDD (time division duplex) or FDD (frequency division duplex) frame structure. However, a consequence of some aspects of existing regulatory restrictions on unlicensed spectrum usage in some regions means that TDD or downlink-only FDD operation may, at least currently, be more likely.

Figure 5:
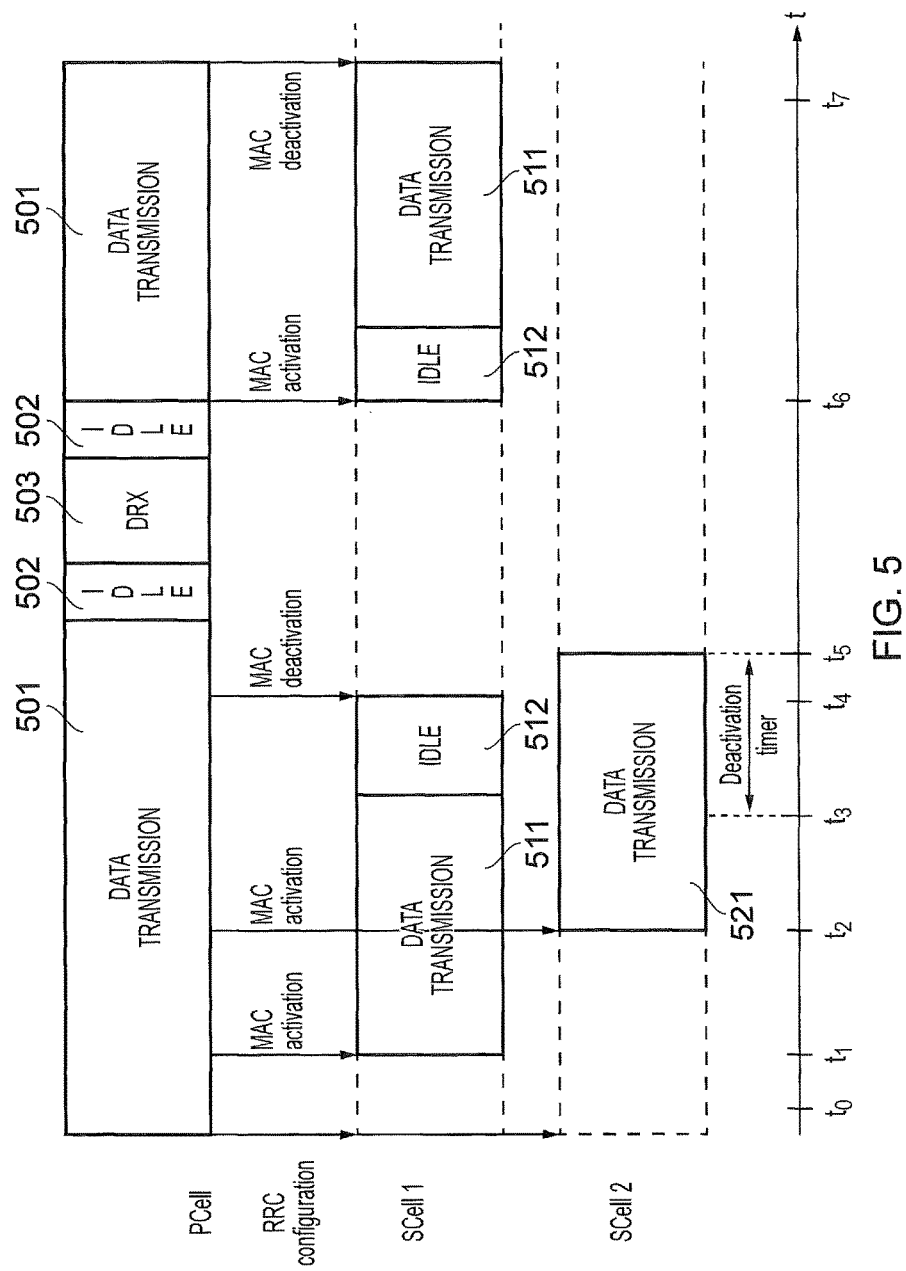
FIG. 5 provides a schematic timeline of an example configuration and activation of SCells in an LTE environment.

FIG. 5 illustrates an example how carrier aggregation can be used in an LTE environment, with two SCells used in conjunction with a PCell for a terminal. In the example of FIG. 5, only the downlink transmissions have been represented in the interest of conciseness. The transmissions in PCell from the UE perspective may be in a data transmission state (501), in an idle state (502) and in a DRX state (503). Dedicated RRC signalling can be used for configuring the carrier aggregation with the terminal. At a point in time $t_0$, the terminal receives an RRC message configuring SCell1 and SCell2. The RRC dedicated message may for example include what is conventionally included in the System Information "SI" such that the terminal does not have to obtain the SCell configuration parameters from SCell as this information would have already been provided via RRC signalling. The SCells are then configured in the terminal but remain deactivated such that they are not in use at this stage. At this stage, the base station can then activate or deactivate the SCell using MAC signalling and which indicated whether an SCell is activated or not and the terminal can then readily start using the SCell using the configuration information already provided. In FIG. 5, at time $t_1$ the SCell1 is activated and data can be transmitted over this aggregated channel (phase 511) or the aggregated channel can also be in idle mode (512). At time $t_4$, SCell1 is then deactivated via another MAC message. As illustrated in this figure, SCell1 may first be in the idle mode 512 and then in the transmission mode 511 when it is active (between times $t_6$ and $t_7$). In other examples, the SCells may not provide any idle mode functions to the UE and may only be used in a data transmission mode or DRX mode. It is also noteworthy that no additional RRC configuration message regarding SCell1 is required after the SCell deactivation as the terminal can keep the SCell configuration, i.e. the SCell can remain configured and deactivated. Although not shown in FIG. 5, the configuration of the SCell may also be changed if appropriate, by means of dedicated RRC signalling. For example an SCell may then be reconfigured, de-configured or newly configured. In the context of LTE, a "configured" SCell generally refers to an activated or deactivated SCell which has already been pre-configured for fast-switching such that it can be quickly activated without the terminal having to obtain the system information etc.

As illustrated with the use of SCell2 between times $t_2$ and $t_5$, a deactivation timer may also be used such that if no content is transmitted via the SCell for more than a period of time, the terminal automatically deactivate the SCell. In this example, at $t_2$ SCell2 is activated using MAC signalling and is used in data transmission mode 521. When SCell2 is no longer used to transmit any content, from time $t_3$, a timer is started and once the timer reaches a pre-determined threshold ("deactivation timer") at time $t_5$, the terminal automatically deactivate SCell2 in the absence of any MAC signalling explicitly deactivating this channel.

While the example of FIG. 5 illustrates a possible PCell/SCell1/SCell2 configuration between a terminal and a base station, different terminals may have different configuration at a point in time. For example, a second terminal may be using the same or a different PCell and may have SCell1 configured but never activated and may have SCell2 configured and activated from $t_0$ to $t_7$. The base station may configure and activate channels for the terminals it is serving as appropriate.

The configuration and activation/deactivation of SCell can therefore be carried via dedicated signalling, sent at relatively low levels (RRC and MAC) with a view to providing more flexibility in the use and activation of SCell for carrier aggregation. Of course, in other examples, the carrier aggregation may use different types of signalling, dedicated or not, as appropriate.

As can be seen above, a channel may be active or provided from a terminal perspective (e.g. configured and activated) and/or may be active or provided from a base station perspective (e.g. provided by the base station and available for use by at least one terminal). With a view to avoiding confusion, when considered from a base station perspective, the terms "active" and "inactive" will be used to clarify whether the channel is provided or not provided by the base station, respectively, and, when considered from a terminal perspective, the terms "activated" and "de-activated" or "deactivated" will be used, to illustrate whether the terminal has been provided a channel or has not been provided a channel, respectively, to communicate with the base station. It is noteworthy that the term "activated" as used herein is not limited to active SCells for a terminal: if a channel is active for a terminal to communicate with the base station as a PCell, with or without carrier aggregation for this terminal, such a channel will also be referred to as "activated" in the interest of clarity and consistency. In other words, with this terminology, when a channel is "activated" for a terminal, it is also necessarily "active" for the base station. However, when a channel is "deactivated" for a terminal, it may be "inactive" (e.g. of deactivated for all terminals served by the base station) or it may still be "active" (e.g. if it is activated for at least one other terminal served by the base station).

The entity (currently the base station in LTE) deciding whether to configure (e.g. add/release) an SCell or whether to activate (e.g. activate/deactivate) an SCell can make use of measurements reports sent by terminals indicating a power and/or quality measured for the SCell. The present LTE mechanism underlying this reporting is based on measurement events A1-A6 and B1-B2 defined in [6]. In particular, in document [6], events A4 and A6 are defined by way of entering and leaving conditions as follows:

Event A4 (Neighbour Becomes Better than Threshold)

$$Mn+Ofn+Ocn-Hys>Thresh \quad \text{Inequality A4-1 (Entering condition):}$$

$$Mn+Ofn+Ocn+Hys<Thresh \quad \text{Inequality A4-2 (Leaving condition):}$$

Where:
  Mn is the measurement result of the neighbouring cell, not taking into account any offsets.
  Ofn is the frequency specific offset of the frequency of the neighbour cell (i.e. offsetFreq as defined within measObjectEUTRA corresponding to the frequency of the neighbour cell).
  Ocn is the cell specific offset of the neighbour cell (i.e. cellIndividualOffset as defined within measObjectEUTRA corresponding to the frequency of the neighbour cell), and set to zero if not configured for the neighbour cell.
  Hys is the hysteresis parameter for this event (i.e. hysteresis as defined within reportConfigEUTRA for this event).
  Thresh is the threshold parameter for this event (i.e. a4-Threshold as defined within reportConfigEUTRA for this event).
  Mn is expressed in dBm in case of RSRP, or in dB in case of RSRQ.
  Ofn, Ocn, Hys are expressed in dB.
  Thresh is expressed in the same unit as Mn.
And
  Event A6 (Neighbour Becomes Offset Better than SCell)

$$Mn+Ocn-Hys>Ms+Ocs+Off \quad \text{Inequality A6-1 (Entering condition):}$$

$$Mn+Ocn+Hys>Ms+Ocs+Off \quad \text{Inequality A6-2 (Leaving condition):}$$

Where:
  The neighbouring cell and the SCell are on the same frequency.
  Mn is the measurement result of the neighbouring cell, not taking into account any offsets.
  Ocn is the cell specific offset of the neighbour cell (i.e. cellIndividualOffset as defined within measObjectEUTRA corresponding to the frequency of the neighbour cell), and set to zero if not configured for the neighbour cell.
  Ms is the measurement result of the serving cell, not taking into account any offsets.
  Ocs is the cell specific offset of the serving cell (i.e. cellIndividualOffset as defined within measObjectEUTRA corresponding to the serving frequency), and is set to zero if not configured for the serving cell.
  Hys is the hysteresis parameter for this event (i.e. hysteresis as defined within reportConfigEUTRA for this event).
  Off is the offset parameter for this event (i.e. a6-Offset as defined within reportConfigEUTRA for this event).
  Mn, Ms are expressed in dBm in case of RSRP, or in dB in case of RSRQ.
  Ocn, Ocs, Hys, Off are expressed in dB.

Accordingly, if the entering condition for one of A4 or A6 is met, the terminal can then send measurement reports for the neighbouring cell to the base station. The base station can then in turn make decisions regarding mobility and carrier aggregation, if appropriate. The term "measurement result" as used in the LTE standard currently refers to one of RSRP or RSRQ. In other words, these LTE events may be entered or left based on one of an RSRP or RSRQ measurement for the neighbouring cell. It is pointed out that the term "measurement result" is used in the present disclosure in a more general sense and includes, but is not limited to, an RSRP and/or RSRQ. The RSRP and RSRQ are presently defined in LTE as the Reference Signal Received Power and the RSRQ Reference Signal Received Quality, respectively.

The RSRP provides a measurement of received power based on the cell-specific reference signal (RS) mentioned above for the considered frequency bandwidth. It is generally based on an averaging of power received for the resources elements (RE) carrying the RS. An RE is generally the smallest resource unit defined in LTE, corresponding to one subcarrier and on OFDM symbol interval. The power received for all the RS transmitted by the base station across the entire bandwidth considered is averaged such that the power in each one of subcarriers carrying an RS is averaged. In other words, the RSRP measurement bandwidth is equivalent of only a single subcarrier and the RSRP provides an indication of a power received for one subcarrier averaged across the entire considered bandwidth.

The RSRQ is derived from the RSRP based on the following relation:

$$RSRQ=N \times RSRP/RSSI, \text{ where } N=\text{number of } RBs \text{ for the RSSI}$$

The term RSSI refers to "Received Signal Strength Indicator" and corresponds to total measured power across a bandwidth. As such, the RSSI includes not only power from LTE transmissions, but also from any noise or interfering signals in the bandwidth. Thus the RSRQ reflect a combination of LTE transmission power (via the RSRP) and of any other transmissions in the same bandwidth (via the RSSI) which may have an impact on the quality of the terminal-base station link. Thus the RSRP can be useful when considering the strength of the LTE transmissions while the RSRQ can be useful when considering the link quality for the LTE transmissions.

Coming back to the events used in LTE for the terminal to determine whether to send measurement reports on neighbouring channels, these events are based on RSRP or RSRQ measured by the terminal as the Mn and Ms parameters ("measurement result") are defined as being either the RSRP or the RSRQ. In view of the RSRQ deriving from the RSRP, these events are ultimately based on the measured RSRP, directly or indirectly. In view of the RSRP being calculated from power measurements for the RS transmitted by the base station, the RSRP in LTE is only available for a channel that is actively used by the base station so that the RS is provided on this channel. Therefore the events currently provided by LTE are not suitable for channels that are not currently being transmitted by the base station and LTE does not provide the means for measuring power on channels not being transmitted or for re-using the events with such channels. Such inactive channels would include for example a configured and inactive SCell or a non-configured SCell. This is the case regardless of the SCell being in a licensed band or in an unlicensed band. It is therefore desirable to obtain an estimated measurement result for channels or carriers which are not currently in use but which may be suitable for carrier aggregation when trying to estimate whether such channels or carriers should be configured and/or activated as SCells. Such a measurement result would also be particularly helpful when estimating the suitability of a channel or carrier for use as an SCell when its frequency bandwidth is in an unlicensed band in view of the higher risk of interferences resulting from the sharing of the band compared to bandwidths in a licensed band.

In accordance with the present disclosure, a measurement result may be provided for a first channel, the first channel being currently not used wherein the measurement result is derived from a measurement result for a second channel, the second channel being in use. For example, the measurement result may be for a transmitted power on the second active channel. In some cases, the RSRP for an active SCell may be used when estimating the suitability of a non-active SCell. The measurement result for the first channel may additionally and optionally be based on a total received power for the first channel. For example, an estimated RSRQ (hereinafter referred to as "vRSRQ" for virtual RSRQ) may be calculated based on a ratio of the RSRP for the second channel and the RSSI for the first channel. In other words, a measurement result may in some examples be provided based on the following relation:

$$vRSRQ_{inactive} = N \times RSRP_{active}/RSSI_{inactive}, \text{ where}$$
$$N = \text{number of } RBs \text{ for the } RSSI_{inactive}$$

In the interest of conciseness and clarity, $vRSRQ_{inactive}$ may sometimes be referred herein as vRSRQ, the $RSRP_{active}$ may be referred to as vRSRP and the measurement result as virtual measurement result. Accordingly, a measurement result can be provided for an inactive channel. Additionally, owing to the RSRP corresponding to an average power for the equivalent of a one sub-carrier band, the actual bandwidth of the "active" channel used for the RSRP measurement should not directly impact the vRSRQ. This facilitates a simplified measurement result calculation for the inactive channel, despite the lack of a directly available RSRP measurement or equivalent measurement for the inactive channel.

If it is decided to use measurement events, existing events may be used, updated to use the virtual measurement results and/or new events can be created based on this vRSRQ. Example new events A7 and A8 may for example be discussed below, with reference to FIGS. 6-7.

New Event A7 can be defined as "inactive SCell becomes better than a threshold". Corresponding entering and leaving conditions may for example be based on a comparison of the vRSRP or vRSRQ for the inactive SCell with a corresponding threshold. This may for example be based on adapting the A4 event mentioned above so that the measurement result Mn is the vRSRP or vRSRQ for the inactive SCell. As a result, the channel for which the virtual measurement result performs better than a threshold can be identified and reported to the base station. This information may be taken into account when deciding channel mobility and/or configuration and/or activation which can in turn help increase the throughput available to terminals while trying to avoid poor quality channels.

Figure 6:
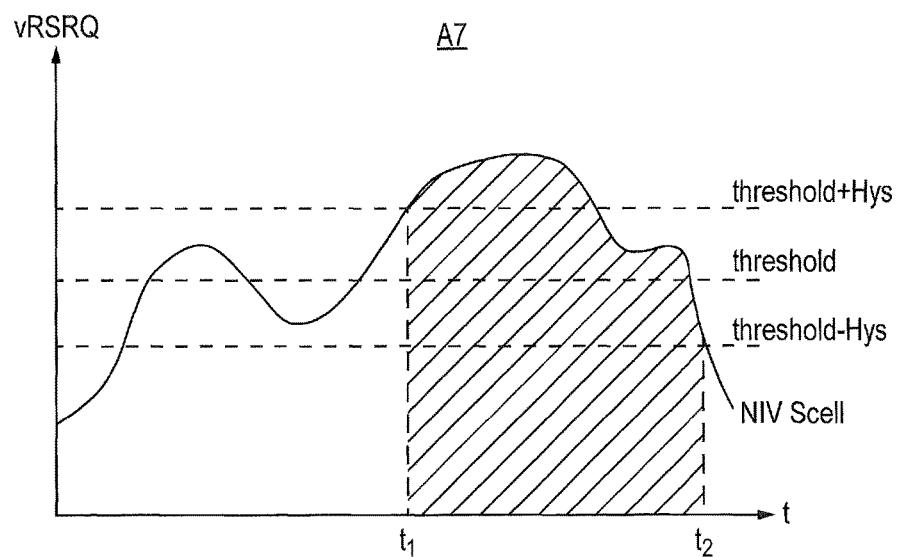
FIG. 6 provides a schematic graph illustrating a first measurement-based event.

FIG. 6 illustrates an example application of the A7 event, in a case where vRSRQ is used as the measurement result and where a hysteresis parameter is used (which is optional) for a inactive SCell. The vRSRQ for the inactive SCell is compared with a threshold and the event is entered at $t_1$ when the vRSRQ becomes greater than (or greater than or equal to) the sum of the threshold and hysteresis parameter. The event A7 will be left at $t_2$, when the vRSRQ fall below the threshold to which the hysteresis parameter has been subtracted.

Event A8 can be defined as "inactive SCell becomes offset better than current SCell". Corresponding entering and leaving conditions may for example be based on a comparison of a virtual measurement result with the same type of measurement result for the current SCell. For example an event condition may be based on a condition for A6 where Mn can be the vRSRP or the vRSRQ and where Ms can be the RSRP for the current SCell or the RSRQ for the current SCell, respectively. In cases where the vRSRQ for a inactive SCell is found to be better than the RSRQ for a SCell currently active for the terminal by at least an offset, the terminal may then send a measurement report, e.g. to the base station. As a result, mobility and/or channels configuration and/or channel activation-deactivation decisions may be made taking into account an expected link quality on the inactive SCell in comparison to the quality currently experienced on an active SCell.

Figure 7:
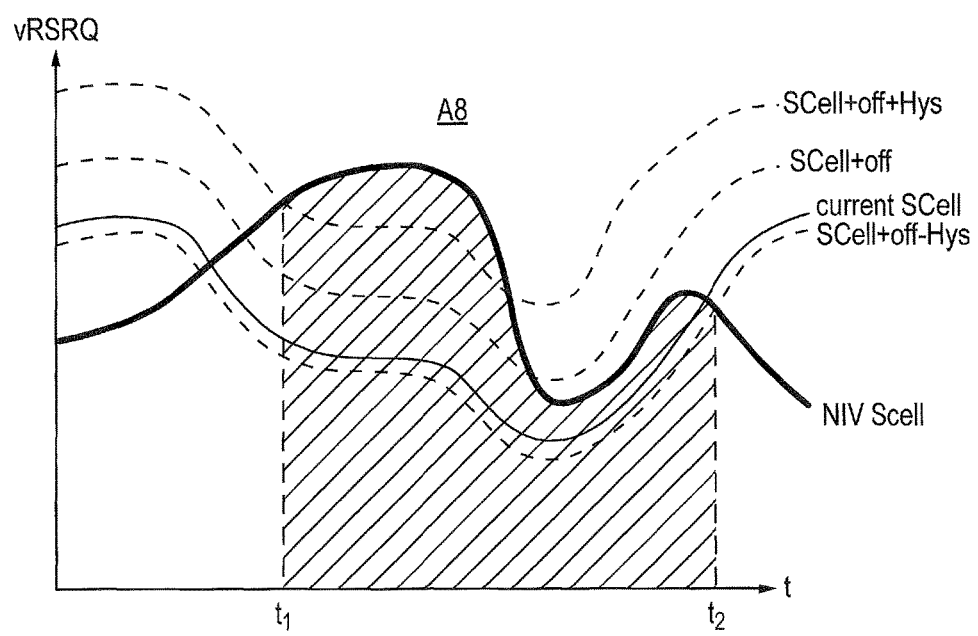
FIG. 7 provides a schematic graph illustrating a first measurement-based event.

FIG. 7 illustrates an example of application of the A8 event where the vRSRQ for a inactive SCell is compared with the vRSRQ for a current SCell and where a hysteresis parameter is used when deciding whether the inactive SCell is performing at least offset better than the current SCell. The conditions are first met at time $t_1$ when the vRSRQ for the inactive SCell is greater than the vRSRQ for the current SCell to which the offset and hysteresis parameters are added. The conditions remain met for as long as the vRSRQ for the SCell is above the vRSRQ for the current SCell to which the offset is added and to which the hysteresis parameter is subtracted. When this is no longer the case, at time $t_2$, the conditions are no longer and the event is thus left.

Alternative new events A7' and A8' could also be provided to cover both active and inactives channels. For example, A7' could be "SCell becomes better that a threshold" wherein the measurement result compared to the threshold could be a conventional measurement result such as RSRP or RSRQ if the SCell is active (which would in this case be similar to event A4) and could be a virtual measurement result, such as a vRSRP or vRSRQ of the SCell is not active. Likewise, A8' could be For example, A7' could be "other SCell becomes offset better than current SCell" wherein the measurement result for the other SCell to be compared to the measurement result for the current SCell could be a conventional measurement result such as RSRP or RSRQ if the other SCell is active (which would in this case be similar to event A6) and could be a virtual measurement result, such as a vRSRP or vRSRQ of the other SCell is not active.

When the conditions for events A7 or A8 are met (represented by the hatched areas in FIGS. 6 and 7), the terminal may send one or more measurement reports to the network (e.g. to the base station). This information is used to report that the inactive SCell is performing better than the threshold and/or that the inactive SCell is performing offset better than a current SCell. This information may in turn be used by the network (e.g. base station) to decide whether to change the channel configuration. It may for example decide to configure and/or activate the channel for carrier aggregation, for example to add a new SCell in view of the reports. The network and/or base station may also consider whether the channel could be a suitable candidate for a PCell—even though this would be less likely in the case of an LAA channel (due to for example the reduced control over the channel link quality). The terminal may send its measurement report in any suitable manner. In some cases, this may involve one or more of: sending a report when the conditions are first met; sending a report when the conditions are no longer met, sending a report periodically for as long as the conditions are met, sending reports based on configuration information sent by the base station, etc.

As mentioned above, existing events may also be used with the new measurement result(s) proposed herein, such as a vRSRP and/or a vRSRQ. For example, the event A4 and A6 can remain unchanged and can also use the new measurement result(s) as the measurement results Mn or Ms. While these measurement results were previously only available for active channels, virtual measurement results may now also be used for inactive channels where no (non-virtual) measurement result is available. In this case, if the conditions for an event are met, the terminal can optionally include in a measurement report that the measurement result use is not a conventional one but one derived from another (active) channel. Such a report could for example include information identifying the active channel used to derive the virtual measurement result Alternatively, the terminal may not report this type of information as the network may be in a position to detect automatically whether the channel was active or not at the time of the measurement and thus to estimate whether the event's condition(s) were assessed on the basis of a non-virtual measurement result or of a virtual measurement result.

Figure 8:
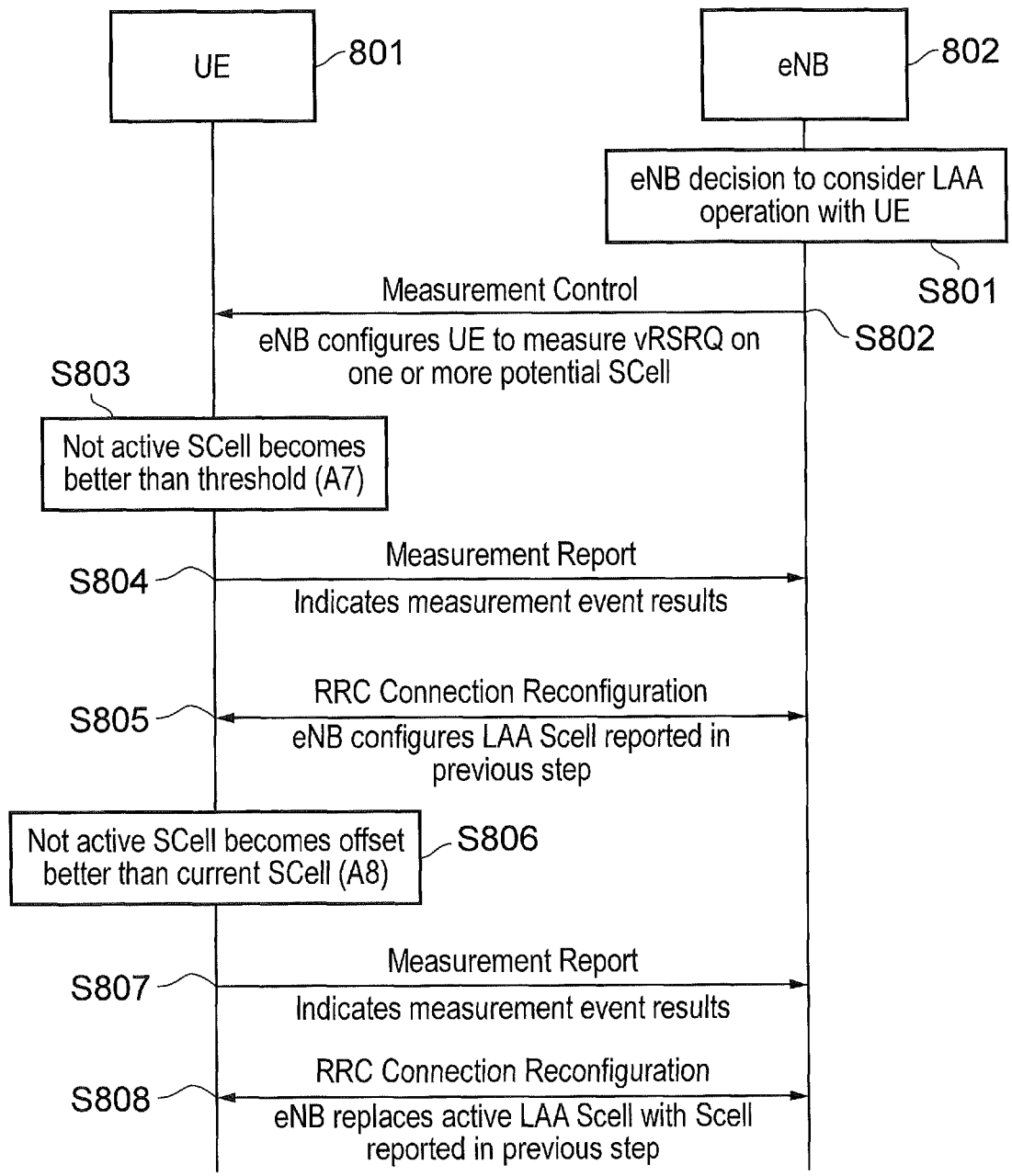
FIG. 8 provides a schematic signalling ladder diagrams representing communications between a base station and a terminal device operating in accordance with some examples of the disclosure.

FIG. 8 illustrates a messaging diagram in accordance with the present disclosure. In this example, the terminal 801 and base station 802 exchange messages regarding measurement of channels. First, at step S801, the base station 802 decides to consider LAA operation with the terminal 801. It thus sends a measurement control message to the terminal configuring the terminal to measure vRSRQ on a number of identified potential SCells. Assuming that the terminal is operable to use events A7 and A8, the terminal can for example be pre-configured to use events A7 and A8 for this or the measurement control message may configure the terminal to do so. At S803, the terminal detects that an inactive channel becomes better than a threshold according to one or a set of conditions (A7). The terminal then sends a measurement report (S804) to the base station indicating the event result and possibly additional information (e.g. the active channel used for the vRSRP calculation, etc.). If the base station decides to change the channels configuration, for example to add a configured SCell or an activated SCell, the terminal and base station can then exchange messages to change the configuration (S805). For example, they may exchange MAC and/or RRC and/or any other type of messages to change the configured SCells for the terminal or to activate or deactivate an SCell. At S806, the terminal detects that an inactive channel becomes offset better than a current SCell according to one or a set of conditions (A8). The terminal then sends a measurement report (S807) to the base station indicating the event result and possibly additional information (e.g. the active channel used for the vRSRP calculation, etc.). If the base station decides to change the channels configuration, for example to add a configured SCell or an activated SCell, the terminal and base station can then exchange messages to change the configuration (S807). For example, they may exchange MAC and/or RRC messages to change the configured SCells for the terminal or to activate or deactivate an SCell as above.

Figure 9:
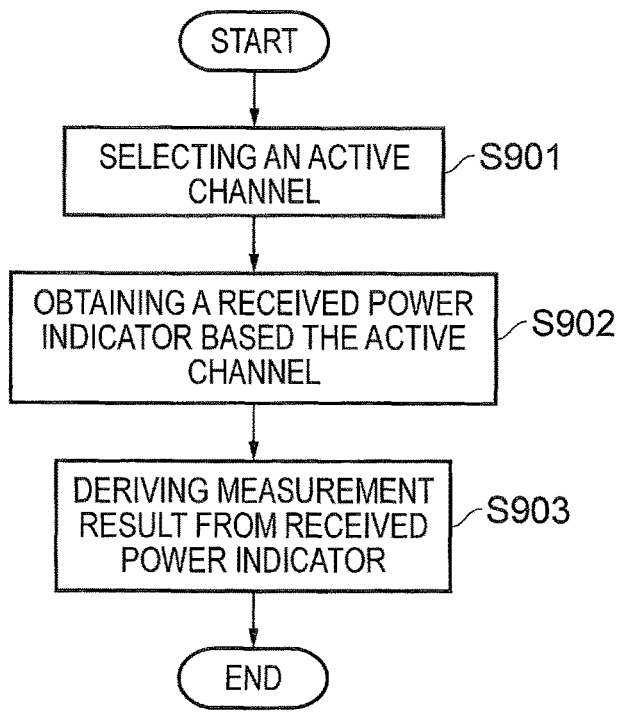
FIG. 9 illustrates an example method of obtaining a measurement result in mobile communications networks.

FIG. 9 illustrates an example method of obtaining a measurement result for an inactive channel in mobile communications networks. The method starts with step S901 where an active channel is selected. The active channel is thus different from the inactive channel. Then, at step S902, a measurement result, for example a received power indicator, is obtained. The received power indicator is based on a measured power for signals transmitted by the base station on the active channel selected at S901. At S903, a virtual measurement result can be derived for the inactive channel from the receiver power indicator. Thereby a virtual measurement result for the inactive channel has been obtained.

Figure 10:
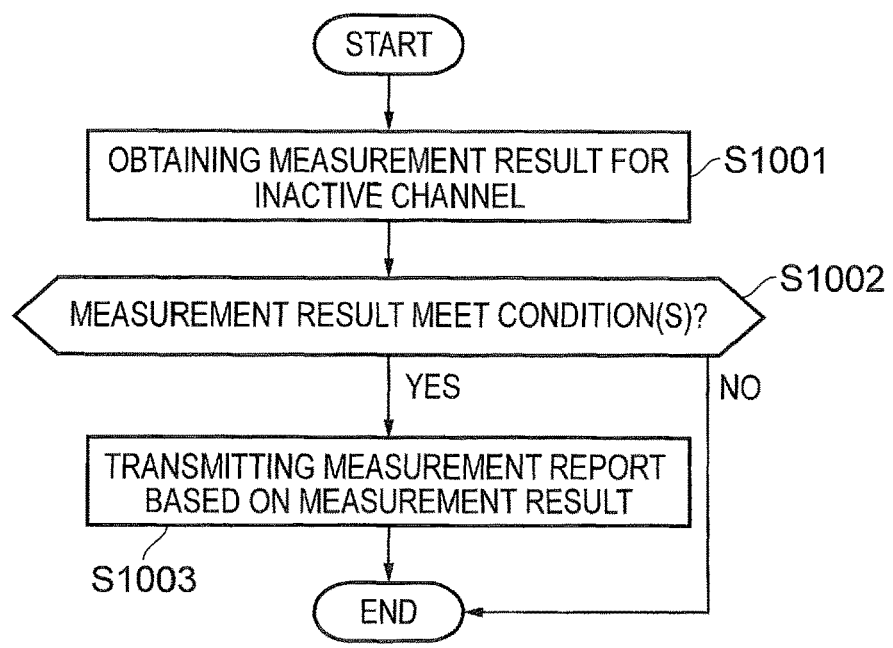
FIG. 10 illustrates an example method of obtaining a measurement report in mobile communications networks.

FIG. 10 illustrates an example method of obtaining a measurement report in mobile communications networks. The first step S1001 involves obtaining a (virtual) measurement result for an inactive channel. This can be obtained using any suitable manner in accordance with the present disclosure, for example in accordance with the example method illustrated in FIG. 9 and discussed above. Then, step S1002, it is determining whether the measurement result meets a set of conditions. A set of conditions may include one condition, two conditions or any other number of conditions. If the set of conditions is met ("YES"), the method moves on to step S1003 where a measurement based on the virtual measurement result is transmitted.

Figure 11:
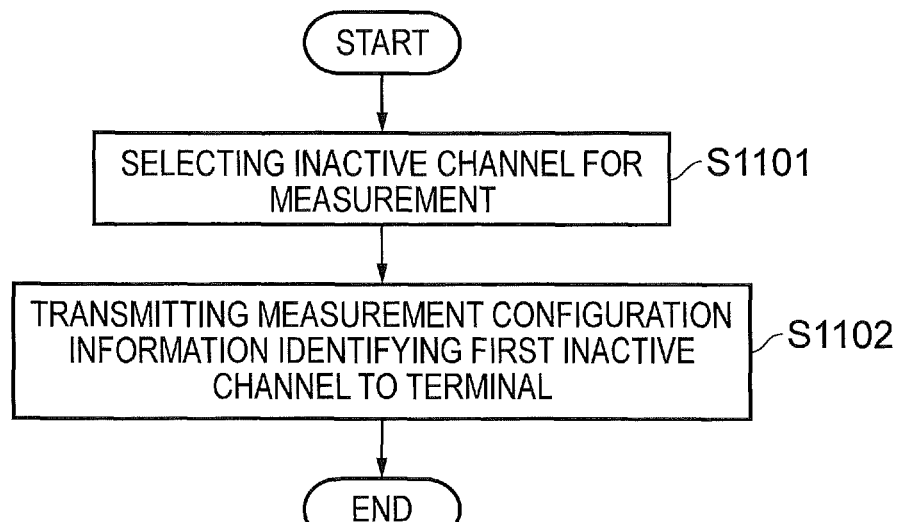
FIG. 11 illustrates an example method of managing measurements for an inactive channel in mobile communications networks.

FIG. 11 illustrates an example method of managing measurements for an inactive channel in mobile communications networks. At the first step, S1101, a first inactive channel is selected for measurement. Following this selection, measurement configuration information identifying the first inactive channel is transmitted to a terminal (S1002) so that the terminal has been provided with information for carrying out measurements on an active channel to obtain a (virtual) measurement result on the selected inactive channel.

There has therefore been provided an arrangement where a virtual measurement result can be obtained by a terminal using a measurement result for an active channel. Thus in an LTE environment the virtual measurement result can be based on at least the two following and different channels:
(i) a possibly inactive channel—e.g. for which no RSRP or RSRQ is available in LTE or is desired and
(ii) active channel—for which the RSRP can be obtained to obtain an vRSRP for the first channel.

If using a condition-based system (e.g. with one or more events), a terminal may decide whether to send a measurement report based on the virtual measurement result. At least channels (i) and (ii) above can be involved, at least when obtaining the virtual measurement result, and channel (iii) below may optionally also be involved, for example for determining whether a condition is met:
(iii) reference channel which is active and for which the RSRP or RSRQ can be obtained (and which may be compared with the vRSRP or vRSRQ).

While channels (i) and (ii) will be different, in some cases, the active channel (ii) can be the same as the reference channel (iii) and in other cases they can be different channels. For example, the terminal may in some cases automatically select a current SCell (if one is available) as active channel (ii) while in other cases it may select the active channel based on one or more parameters (e.g. corresponding base station, parameters set by the base station, type of SCell, etc.) such that the selected channel may or may not correspond to an activated channel for the terminal. Optionally, the base station can provide the terminal with an indication of one or more channels to use for the vRSRP and/or vRSRQ or of parameters to use for the active SCell selection.

The "type of SCell" mentioned above may refer for example to whether the inactive channel is a channel in an unlicensed band. If the inactive channel is an LAA SCell, selecting another LAA channel as the active channel may improve the accuracy of the vRSRP and/or vRSRQ compared to using a non-LAA channel. The base station corresponding to the active SCell may also be taken into account. In effect, a vRSRP (and thus vRSRQ) obtained from an active channel provided by a base station is likely to provide a relatively accurate estimation of the power that could be achieved for another channel from the same base station compared to a vRSRP obtained from an active channel provided by a different base station.

Even though both the vRSRP and vRSRQ measurement results may be used individually or in combination in an LTE environment, for LAA channels, the vRSRQ may provide a more complete picture of the suitability of a inactive channel as a PCell and/or SCell. In effect, the vRSRQ also reflects the RRSI for this inactive channel and therefore takes into account possible noise and interference levels on the channel on a bandwidth shared with other technologies and parties. Additional frequency-based computing may be carried out with a view to improving the accuracy of the virtual measurement result as mentioned below.

Additionally, even though the present disclosure has been discussed in the context of obtaining a measurement for an inactive channel, the invention is not limited to obtaining a virtual measurement for an inactive channel but can also be used for an active channel. If for example a base station is not activated for the terminal, the terminal may decide to obtain a virtual measurement. The channel may be in any suitable configuration (active/inactive, activated/deactivated) and the virtual measurements may be used whenever the terminal, base station and/or any other network element estimate that it is preferable or at least appropriate.

The use of an available measurement result from another active channel can reduce the complexity of providing a measurement result for an inactive channel (for which no measurement result is otherwise available) as it re-uses existing measurement means to derive a virtual measurement result for the inactive channel. As a result, the terminal also requires fewer modifications to implement such a virtual measurement result calculation which simplifies the implementation of the present disclosure.

As mentioned above, a channel which has been qualified as inactive is a channel that is not currently used by the corresponding base station to communicate with terminals. On the other hand, an active channel is a channel that is made available by the base station to at least one terminal, wherein this terminal may be the terminal making the measurement or may be a different terminal. In other words, an inactive channel for a base station is a channel that the base station is not providing to any terminal. For example, an inactive channel may be a configured SCell which is inactive for all terminals served by the base station, a non-configured SCell, a frequency band in an unlicensed band that could be used by the base station for carrier aggregation but is not currently used with any terminal, etc. If we consider a first "inactive" channel for which is measurement result is sought by a first terminal and a second "active" channel which is used for deriving a measurement result for the first channel, we may for example have any of the following (non-exhaustively listed) situations for the second channel: the second active channel may be activated for the first terminal (e.g. as a PCell with or without carrier aggregation, or as an SCell if carrier aggregation is available), the second active channel may not be activated for the first terminal and may be activated for a second terminal served by the base station. For example, the second active channel may be configured and deactivated for the first terminal (if carrier aggregation is available) or may not be configured for the first terminal (either with or without carrier aggregation). An alternative wording for an active or inactive channel could thus for example be an "in use" or "not in use" channel, respectively.

In the context of measurement, measurement reporting or carrier aggregation, the terms channel or carrier have been used interchangeably and refer to any frequency band that may be used for communications between the base station and the terminal (for example but, not limited to, an LTE channel or carrier). The channel may for example be used or considered for use as a PCell or as a SCell in an LTE environment or may be in a licensed or unlicensed band. Even though the examples above are mainly focussed on providing a measurement result for a channel that could potentially be used as an SCell, the same teachings apply to any channel. It can for example be used for channels could be considered for use as a PCell (without or without carrier aggregation). For example, an event or set of conditions such as "inactive channel performing offset better than PCell" may be used if appropriate.

The examples above illustrate a virtual measurement result wherein these examples are based on a measurement result from a single active channel. However it is within the scope of the present disclosure that the virtual measurement may be based on measurement results for two or more of active channels. For example, the terminal may calculate an average vRSRP for two or more channels provided by a base station. In some examples, the terminal may select any active channels deemed appropriate and may use the an vRSRQ derived from a vRSRP calculated as the an average RSRP for the selected active channels. The selection may for example involve selecting active channels showing similarities with the inactive channel (e.g. same base station, similar bandwidth, licensed or not licensed band, etc.).

The virtual measurement result for an inactive channel is based on, or derived from, a measurement result obtained from a different active channel and any calculation based from the measurement result from the active channel may be adjusted as deemed appropriate with a view to improving its accuracy. For example, frequency modelling may be used to adjust the virtual measurement result taking into account aspects such as an expected level of interferences, frequency fading depending on distance or obstacles, and/or any other frequency channel modelling information. For example, it may be expected that some frequencies shared with some WiFi channels may experience higher interferences than other WiFi channels based on previous observations of interferences in unlicensed frequencies shared with a WiFi technology. In another example, it may be known that a signal in a first frequency band will fade quicker or slower than a signal in a signal in a second frequency when carried over a distance, or that in an urban or obstacle-rich environment, some frequencies will travel better than others. Any such channel or frequency-based modelling information may be used to correct or adjust the virtual measurement result. In some examples, an offset may be calculated using such modelling taking into account the frequency range for the active channel(s) used to derive the virtual measurement result and the frequency band for the inactive channel, wherein the offset represent the expected difference in the measurement result between the two (or more) frequency bands. The measurement result obtained from the active channel (e.g. RSRP) may then be modified using the offset with a view to improving the accuracy of the virtual measurement result.

The terminal may be able to determine or select which channel(s) to use for obtaining a measurement result based any suitable criterion or set of criteria. For example it may be based on a pre-configuration of channels to monitor stored in the terminal and/or on measurement configuration received from the base station indicating one or more channels to monitor. In some examples, the terminal may automatically monitor a channel (e.g. obtain a measurement result for the channel) if it is a "configured" channel as discussed earlier. That is, in a case where the channel is already configured for use as an SCell by the terminal and may be quickly activated/deactivated using signalling and the configuration information provided to the terminal (for activation). However in other cases, the channel may not be a configured channel setup for fast-switching but may instead be configured in the terminal for measurement only. There may be cases where, following a positive report from a terminal about a first non-configured SCell, the base station may decide that this first channel is likely to be or to become suitable for use as an SCell. The base station can then de-configure another less suitable SCell and configure the first SCell for one or more terminal. The base station may also activate the first SCell or it may wait for further positive reports from other terminals or for any other suitable moment to activate the first SCell and thus leave it inactive at first.

Also, events have been defined by a set of two conditions (entering/leaving conditions) but in other examples, the event may be based on a single condition or on three or more conditions. More generally, the present disclosure is not limited to an LTE-type of event but intends to cover the possibility of taking action following the determination that a measurement result meets one or more conditions or that two or more measurement results meet one or more conditions.

It should also be understood that the example of vRSRP and vRSRQ has been used as it facilitates integration with the current measurement results and methods used in LTE and can therefore be useful in an LTE system. However, the present disclosure is not limited to LTE, or to the particular requirements of the current LTE definitions and specifications. The present disclosure is intended to cover any suitable power measurement, the vRSRP being one possible example of a power measurement for a signal transmitted by the base station, and the vRSRQ being one possible signal-noise measurement derived from a power measurement for a signal transmitted by the base station and from a power measurement for signals transmitted in a bandwidth (the bandwidth of the target inactive channel).

As used herein, the expression "greater than" is intended to explicitly cover both "greater than or equal to" and "greater than but not equal to". Likewise, the expression "less than" is intended to explicitly cover both "less than or equal to" and "less than but not equal to".

As used herein, transmitting information or a message to an element may involve sending one or more messages to the element and may involve sending part of the information separately from the rest of the information. For example, if measurement configuration information sent by a base station to a terminal includes an identification of inactive channels to monitor and of active channels that can be used for generating measurement results for the inactive channels, the inactive channel(s) identification information may be sent in a first message (or a first group of messages) and the active channel(s) identification information may be sent separately in a second message (or second group of messages). The base station may later update the active channel(s) identification information without updating the inactive channel(s) identification. All of these example communications are thus intended to be covered as examples of "transmitting (this type of) measurement configuration information" to the terminal.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1 A method of obtaining a virtual measurement result for a first channel in a wireless telecommunications system, the system comprising one or more terminals and a base station providing one or more active channels for communicating wireless signals with the one or more terminals; the method comprising:
  selecting an active channel of the one or more active channels, the active channel being different from the first channel;
  obtaining a first measurement result based on signals transmitted by the base station on the active channel; and
  deriving a virtual measurement result for the first channel from the first measurement result, thereby obtaining a virtual measurement result for the first channel.

Paragraph 2 A method according to Paragraph 1, wherein a channel is inactive if it is not currently provided by the base station for use by the one or more terminals and wherein the first channel is an inactive channel.

Paragraph 3 A method according to Paragraph 1 or Paragraph 2, wherein the first measurement result comprises a received power indicator, wherein the received power indicator is based on a measured power for signals transmitted by the base station on the active channel.

Paragraph 4 A method according to Paragraph 2, wherein the received power indicator is based on the received power for a reference signal transmitted by the base station on the active channel.

Paragraph 5 A method according to any one of Paragraph 1 to Paragraph 4, the method further comprising obtaining a second measurement result, the second measurement result being for the first channel wherein the virtual measurement result is further based on the second measurement result.

Paragraph 6 A method according to Paragraph 5, wherein the second measurement result comprises a signal strength indicator based on a total received power for any received signals in the bandwidth of the first channel.

Paragraph 7 A method according to Paragraph 5 or Paragraph 6, wherein the virtual measurement result is derived from a ratio of the first measurement result to second measurement result.

Paragraph 8 A method according to any one of Paragraph 5 to Paragraph 7, wherein the wireless telecommunications system is a 3GPP system, and optionally an LTE system, and wherein the second measurement result is a Received Signal Strength Indicator "RSSI".

Paragraph 9 A method according to any one of Paragraph 1 to Paragraph 8, wherein the wireless telecommunications system is a 3GPP system, and optionally an LTE system.

Paragraph 10 A method according to Paragraph 9, wherein the first measurement result is a Reference Signal Received Power "RSRP".

Paragraph 11 A method according to any one of Paragraph 1 to Paragraph 10, wherein the selecting an active channel comprises a first terminal of the one or more terminals selecting the active channel and wherein selected active channel is one of: a channel provided by the base station to the first terminal and a channel provided by the base station to one or more terminals other than the first terminal.

Paragraph 12 A method according to any one of Paragraph 1 to Paragraph 11, wherein the first channel is in a frequency band which can be shared by the wireless telecommunications system and by other wireless communications systems.

Paragraph 13 A method according to any one of Paragraph 1 to Paragraph 12, the method comprising:
selecting a second active channel of the one or more active channels; and
obtaining a further measurement result based on signals transmitted by the base station on the second active channel; and
deriving the virtual measurement result for the first channel from the further measurement result.

Paragraph 14 A method according to any one of Paragraph 1 to Paragraph 13, wherein the selecting an active channel comprises a first terminal of the one or more terminals selecting the active channel and wherein the first channel is one of an inactive channel pre-configured with the first terminal for use for carrier aggregation and an inactive channel not configured with the first terminal for use for carrier aggregation, wherein a channel is inactive if it is not currently provided by the base station for use by the one or more terminals.

Paragraph 15 A method of transmitting a measurement report in a wireless telecommunications system, the system comprising one or more terminals and a base station providing one or more active channels for communicating wireless signals with the one or more terminals, the method comprising:
obtaining a virtual measurement result for an first channel according to the method of any of Paragraph 1 to Paragraph 14;
determining whether the virtual measurement result meets a set of conditions, the set of conditions comprising one or more conditions; and
if it is determined that the virtual measurement result meets the set of conditions, transmitting a measurement based on the virtual measurement result.

Paragraph 16 A method according to Paragraph 15, wherein a channel is inactive if it is not currently provided by the base station for use by the one or more terminals and wherein the first channel is an inactive channel.

Paragraph 17 A method according to Paragraph 15 or Paragraph 16, wherein determining whether the virtual measurement result meets a set of conditions comprises comparing the virtual measurement result with a threshold.

Paragraph 18 A method according to Paragraph 15 or Paragraph 17 wherein determining whether the measurement result meets a set of conditions comprises
obtaining a measurement result for a second channel, the second channel being one of the one or more active channels provided by the base station; and
comparing the virtual measurement result for the first channel with the obtained measurement result.

Paragraph 19 A terminal device for use in a wireless telecommunications system, the system comprising a base station providing one or more active channels for communicating wireless signals with the terminal; the terminal device being configured to:
select an active channel of the one or more active channels, the active channel being different from the first channel;
obtain a first measurement result based on signals transmitted by the base station on the active channel;
derive a virtual measurement result for a first channel from the first measurement result, thereby obtaining a virtual measurement result for the first channel.

Paragraph 20 A terminal device according to Paragraph 19 wherein a channel is inactive if it is not currently provided by the base station for use by one or more terminals and wherein the first channel is an inactive channel.

Paragraph 21 Circuitry for a terminal device for use in a wireless telecommunications system, the system comprising a base station providing one or more active channels for communicating wireless signals with the terminal; wherein the circuitry comprises a controller element and a transceiver element configured to operate together to:
select an active channel of the one or more active channels, the active channel being different from the first channel;
obtain a first measurement result, wherein the first measurement result is based on signals transmitted by the base station on the active channel;
derive a virtual measurement result for the first channel from the first measurement result, thereby obtaining a virtual measurement result for the first channel.

Paragraph 22 A method of managing measurements for a channel in a wireless telecommunications system, the system comprising one or more terminals and a base station providing one or more active channels for communicating wireless signals with the one or more terminals; the method comprising:
selecting a first channel for measurement; and
transmitting, to a first terminal of the one or more terminals, measurement configuration information identifying the first channel for the terminal to obtain a virtual measurement result on; wherein the virtual measurement result is derived from measurements carried out on an active channel different from the first channel.

Paragraph 23 A method according to Paragraph 22 wherein a channel is inactive if it is not currently provided by the base station for use by the one or more terminals and wherein the first channel is an inactive channel.

Paragraph 24 A method according to Paragraph 22 or Paragraph 23, the method comprising determining, upon receipt of a measurement report from the first terminal, whether to configure the first channel for use with the one or more terminals, wherein the measurement report comprises measurement information derived from a virtual measurement result for the selected first channel.

Paragraph 25 A method according to Paragraph 23 wherein, based on the measurement report received from the first terminal, the first channel is configured for use with at least one of the one or more terminals as an aggregated channel in a carrier aggregation mode.

Paragraph 26 A method according to any one of Paragraph 22 to Paragraph 25, wherein the method comprises identifying an active channel for deriving a virtual measurement result for the first channel, and wherein the measurement configuration information identifies the active channel.

Paragraph 27 A base station for use in a wireless telecommunications system, the base station being configured to provide one or more active channels for communicating wireless signals with one or more terminals of the wireless telecommunications system; the base station device being configured to:
  select a first channel for measurement; and
  transmit, to a first terminal of the one or more terminals, measurement configuration information identifying the first channel for the terminal to obtain a virtual measurement result on; wherein the virtual measurement result is derived from measurements carried out on an active channel different from the first channel.

Paragraph 28 Circuitry for a base station for use in a wireless telecommunications system, the base station being configured to provide one or more active channels for communicating wireless signals with one or more terminals of the wireless telecommunications system; wherein the circuitry comprises a controller element and a transceiver element configured to operate together to:
  select a first channel for measurement; and
  transmit, to a first terminal of the one or more terminals, measurement configuration information identifying the first channel for the terminal to obtain a virtual measurement result on; wherein the virtual measurement result is derived from measurements carried out on an active channel different from the first channel.

Paragraph 29 A wireless telecommunication system comprising:
  a terminal device according to Paragraph 19; and
  a base station according to Paragraph 27.

REFERENCES

[1] Holma H. and Toskala A, "LTE for UMTS OFDMA and SC-FDMA based radio access", John Wiley and Sons, 2009
[2] ETSI TS 136 211 V11.5.0 (2014-01)/3GPP TS 36.211 version 11.5.0 Release 11
[3] ETSI TS 136 212 V11.4.0 (2014-01)/3GPP TS 36.212 version 11.4.0 Release 11
[4] ETSI TS 136 213 V11.6.0 (2014-03)/3GPP TS 36.213 version 11.6.0 Release 11
[5] ETSI TS 136 321 V11.5.0 (2014-03)/3GPP TS 36.321 version 11.5.0 Release 11
[6] ETSI TS 136 331 V12.3.0 (2014-09)/3GPP TS 36.331 version 12.3.0 Release 12

What is claimed is:

1. A method of obtaining a virtual measurement result for a first channel in a wireless telecommunications system, the system comprising one or more terminals and a base station providing one or more active channels for communicating wireless signals with the one or more terminals, the method comprising:
  selecting a first active channel of the one or more active channels, the first active channel being different from the first channel;
  detecting a second active channel of the one or more active channels;
  obtaining a first measurement result based on signals transmitted by the base station on the first active channel and the second active channel;
  deriving a virtual measurement result for the first channel from the first measurement result, thereby obtaining a virtual measurement result for the first channel;
  transmitting a measurement report corresponding to the virtual measurement result to the base station; and
  receiving, from the base station, a Radio Resource Control (RRC) message allocating one or more channels to the one or more terminals based on the measurement report.

2. The method according to claim 1, wherein a channel is inactive if it is not currently provided by the base station for use by the one or more terminals and the first channel is an inactive channel.

3. The method according to claim 1, wherein the first measurement result comprises a received power indicator, and the received power indicator is based on a measured power for signals transmitted by the base station on the first active channel.

4. The method according to claim 3, wherein the received power indicator is based on the received power for a reference signal transmitted by the base station on the first active channel.

5. The method according to claim 1, further comprising:
  obtaining a second measurement result, the second measurement result being for the first channel, wherein the virtual measurement result is further based on the second measurement result.

6. The method according to claim 5, wherein the second measurement result comprises a signal strength indicator based on a total received power for any received signals in the bandwidth of the first channel.

7. The method according to claim 5, wherein the virtual measurement result is derived from a ratio of the first measurement result to second measurement result.

8. The method according to claim 5, wherein the wireless telecommunications system is a 3GPP system, and the second measurement result is a Received Signal Strength Indicator (RSSI).

9. The method according to claim 1, wherein the wireless telecommunications system is a 3GPP system.

10. The method according to claim 9, wherein the first measurement result is a Reference Signal Received Power (RSRP).

11. The method according to claim 1, wherein selecting the first active channel comprises a first terminal of the one or more terminals selecting the active channel and the first selected active channel is one of: a channel provided by the base station to the first terminal and a channel provided by the base station to one or more terminals other than the first terminal.

12. The method according to claim 1, wherein the first channel is in a frequency band which can be shared by the wireless telecommunications system and by other wireless communications systems.

13. The method according to claim 1, further comprising:
selecting the second active channel of the one or more active channels;
obtaining a further measurement result based on signals transmitted by the base station on the second active channel; and
deriving the virtual measurement result for the first channel from the further measurement result.

14. The method according to claim 1, wherein selecting the first active channel comprises a first terminal of the one or more terminals selecting the active channel and the first channel is one of an inactive channel pre-configured with the first terminal for use for carrier aggregation and an inactive channel not configured with the first terminal for use for carrier aggregation, and a channel is inactive if it is not currently provided by the base station for use by the one or more terminals.

15. A method of transmitting a measurement report in a wireless telecommunications system, the system comprising one or more terminals and a base station providing one or more active channels for communicating wireless signals with the one or more terminals, the method comprising:
selecting an active channel of the one or more active channels, the active channel being different from the first channel;
obtaining a first measurement result based on signals transmitted by the base station on the active channel;
deriving a virtual measurement result for the first channel from the first measurement result, thereby obtaining a virtual measurement result for the first channel;
determining whether the virtual measurement result meets a set of conditions, the set of conditions comprising one or more conditions; and
if it is determined that the virtual measurement result meets the set of conditions, transmitting a measurement based on the virtual measurement result.

16. The method according to claim 15, wherein a channel is inactive if it is not currently provided by the base station for use by the one or more terminals and the first channel is an inactive channel.

17. The method according to claim 15, wherein determining whether the virtual measurement result meets a set of conditions comprises comparing the virtual measurement result with a threshold.

18. The method according to claim 15 wherein determining whether the measurement result meets a set of conditions comprises:
obtaining a measurement result for a second channel, the second channel being one of the one or more active channels provided by the base station; and
comparing the virtual measurement result for the first channel with the obtained measurement result.

19. A terminal device for use in a wireless telecommunications system, the system comprising a base station providing one or more active channels for communicating wireless signals with the terminal, the terminal device comprising:
circuitry configured to:
select a first active channel of the one or more active channels, the first active channel being different from the first channel;
detect a second active channel of the one or more active channels;
obtain a first measurement result based on signals transmitted by the base station on the first active channel and the second active channel;
derive a virtual measurement result for a first channel from the first measurement result, thereby obtaining a virtual measurement result for the first channel;
transmit a measurement report corresponding to the virtual measurement result to the base station; and
receive, from the base station, a Radio Resource Control (RRC) message allocating one or more channels to the terminal device based on the measurement report.

20. The terminal device according to claim 19, wherein a channel is inactive if it is not currently provided by the base station for use by one or more terminals and the first channel is an inactive channel.

21. Circuitry for a terminal device for use in a wireless telecommunications system, the system comprising a base station providing one or more active channels for communicating wireless signals with the terminal, wherein the circuitry comprises:
a controller element and a transceiver element configured to operate together to:
select a first active channel of the one or more active channels, the first active channel being different from the first channel;
detect a second active channel of the one or more active channels;
obtain a first measurement result, wherein the first measurement result is based on signals transmitted by the base station on the first active channel and the second active channel;
derive a virtual measurement result for the first channel from the first measurement result, thereby obtaining a virtual measurement result for the first channel;
transmit a measurement report corresponding to the virtual measurement result to the base station; and
receive, from the base station, a Radio Resource Control (RRC) message allocating one or more channels to the terminal device based on the measurement report.

* * * * *